(12) United States Patent
Bowman

(10) Patent No.: US 7,931,807 B2
(45) Date of Patent: *Apr. 26, 2011

(54) METHOD FOR REMOVING CONTAMINANTS FROM GROUND WATER

(75) Inventor: Reid Bowman, Ojai, CA (US)

(73) Assignee: Applied Process Technology, Inc., Pleasant Hill, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/575,734

(22) Filed: Oct. 8, 2009

(65) Prior Publication Data

US 2010/0089827 A1   Apr. 15, 2010

Related U.S. Application Data

(63) Continuation of application No. 12/079,778, filed on Mar. 28, 2008, now Pat. No. 7,618,537.

(60) Provisional application No. 60/920,993, filed on Mar. 30, 2007.

(51) Int. Cl.
C02F 3/00 (2006.01)

(52) U.S. Cl. ........ 210/620; 210/621; 210/622; 210/627; 210/631

(58) Field of Classification Search .......... 210/620–622, 210/627, 631
See application file for complete search history.

(56) References Cited

U.S. PATENT DOCUMENTS

| | | | |
|---|---|---|---|
| 4,746,435 A | 5/1988 | Onishi et al. | |
| 6,077,429 A | 6/2000 | Frankenberger, Jr. et al. | |
| 7,491,331 B2 | 2/2009 | Rittmann et al. | |
| 7,618,537 B2 * | 11/2009 | Bowman | 210/620 |
| 2005/0218064 A1 * | 10/2005 | Sengupta et al. | 210/321.89 |
| 2006/0292684 A1 | 12/2006 | Bentley | |

OTHER PUBLICATIONS

Grant & Hackh's Chemical Dictionary, 5th ed., McGraw-Hill, 1987, p. 497.*
Achenbach, L.A. et al., *The Biochemistry and Genetics of Perchlorate Reduction*, Chapter 12, 13 pages (2005).
Adham, S. et al., Membrane BioFilm Reactor Process for Nitrate and Perchlorate Removal in AWWA Research Foundation Report (2004).
Banaszak, J.E. et al., "Subsurface interactions of actinide species and microorganisms: implications on bioremediaiton of actinide-organic mixtures", *Journal of Radioanalytical and Nuclear Chemistry*, 241(2):385-435 (1999).
City and County of San Francisco, Department of Public Health, Environmental Health, n-Nitrosodimethylamine (NDMA) White Paper, pp. 1-7 (Updated May 20, 2004).
Chung, J. et al., "Simultaneous bio-reduction of nitrate, perchlorate, selenate, chromate, arsenate, and dibromochloropropane using a hydrogen-based membrane biofilm reactor", *Biodegradation*, 18(2):199-209 (2006).
Chung, J. et al., "Bio-reduction of N-nitrosodimethylamine (NDMA) using a hydrogen-based membrane biofilm reactor", *Chemosphere*, 70(3):516-520 (2008).
Coates, J.D. and Achenbach, L.A. *The Microbiology of Perchlorate Reduction and Its Bioremediative Application*, Chapter 11, 15 pages (2001).

(Continued)

*Primary Examiner* — Chester T Barry
(74) *Attorney, Agent, or Firm* — LeeAnn Gorthey; Judy M. Mohr; King & Spalding LLP

(57) ABSTRACT

Apparatus and methods for water treatment are described, particularly for the simultaneous removal of nitrate, perchlorate, and other organic contaminates from contaminated water using a membrane biofilm reactor (MBfR).

21 Claims, 1 Drawing Sheet

OTHER PUBLICATIONS

Dries, D. et al., "Nitrate Removal From Drinking Water by Means of Hydrogenotrophic Denitrifiers in a Polyurethane Carrier Reactor", *Water Supply*, 6(3):181-92 1988.

Ergas, S.J. and Ruess, A.F., "Hydrogenotrophic Dentrification of Drinking Water Using a Hollow Fibre Membrane Bioreactor", *Journal of Water Supply Research and Technology-AQUA* 50(3):161-71 (2001).

Green, M. et al., "Kinetics of a Fluidized-Bed Reactor for Ground-Water Denitrification", *Applied Microbiology and Biotechnology*, 43:188-93 (1995).

Gunnison, D. et al., "Attenuation mechanisms of N-nitrosodimethylamine at an operating intercept and treat groundwater remediation system", *Journal of Hazardous Materials*, 73(2):179-197 (2000).

Klopffer, M.H. and Flaconnèche, B., "Transport Properties of Gases in Polymers: Bibliographic Review", *Oil & Gas Science and Technology—Rev. IFP*, 56(3):223-244 (2001).

Kurt, M. et al., "Biological Denitrification of Drinking Water Using Autotrophic Organisms with $H_2$ in a Fluidized-Bed Biofilm Reactor", 29:493-501 (1987).

Lazarova, V.Z. et al., "Biofilm Performance of a Fluidized Bed Biofilm fro Drinking Water Denitrification", *Water Science Technology*, 26(3-4):555-66 (1992).

Lee, K.C. and Rittmann, B.E., "A Novel Hollow-Fibre Membrane Biofilm Reactor for Autohydrogenotrophic Denitrification of Drinking Water", *Water Science and Technology*, 41(4-5):219-26 (2000).

Lee, K.C. and Rittmann, B.E., "Applying a novel autohydrogenotrophic hollow-fiber membrane biofilm reactor for denitrification of drinking water", *Water Research*, 36:2040-52 (2002).

Liessens, J. et al., "Removing Nitrate with a Methylotrophic Fluidized Bed: Technology and Operating Performance", *Journal AWWA*, 85:144-54 (1993).

Loach, P.A. and Fasman, G.D. (Eds.) Handbook of Biochemistry and Molecular Biology (3rd ed.), Physical and Chemical Data, vol. I, pp. 123-130, CRC Press (1976).

Mitch et al., "N-Nitrosodimethylamine (NDMA) as a Drinking Water Contaminant: A Review", *Environmental Engineering Science*, 20(5):389-404 (2003).

Nozawa-Inoue et al., "Reduction of Perchlorate and Nitarte by Microbial Communities in Vadose Soil", *Applied and Environmental Microbiology*, 71(7):3928-3934 (2005).

Nerenberg, R., "Membrane Biofilm Reactors for Water and Wastewater Treatment", 2005 Borchardt Conference: A seminar on Advances in water and Wastewater Treatment, Conference Proceedings, Feb. 25, 2005 pp. 1-20.

Nerenberg, R., "Perchlorate removal from drinking water with a hydrogen-based, hollow-fiber membrane biofilm reactor", Ph.D. Dissertation at Northwestern University (2003).

Nerenberg, R. et al., "Perchlorate Reduction in a Hydrogen-Based Membrane-Biofilm Reactor", *Journal AWWA*, 94:103-14 (2002).

Environmental Protection Agency, EPA, Perchlorate Treatment Technology Update, Federal Facilities Forum Issue Paper, 82 pages, (May 2005).

Rittmann, B. E., *The Handbook of Environmental Chemistry*, "Fundamentals and Application of Biofilm Processes in Drinking-Water Treatment", Editor J. Hrubek. 5B:61-74 (1995).

Rittman, B.E. et al., "Hydrogen-Based Hollow-Fiber Membrane Biofilm Reactor (MBfR) for Removing Oxidized Contaminants", *Water Science and Technology: Water Supply*, 4:127-133 (2004).

Soares, M.I.M. and Abeliovich, A., "Wheat Straw as Substrate for Water Denitrification", *Water Research*, 32(12):3790-94 (1998).

Urbain, V. et al., "Membrane Bioreactor: A New Treatment Tool", *Journal AWWA*, 88:75-86 (1996).

Xu, J. et al. "Microbial Degradation of Perchlorate: Principles and Applications", *Environmental Engineering Science*, 20:405-22 (2003).

Xu, J. et al. Chlorate and Nitrate Reduction Pathways are Separately Induced in the Perchlorate-Respiring Bacterium *Deschlorosoma sp.* KJ and the Chorate-Respiring bacterium *Pseudomonas sp.* PDA, *Water Research*, 38:673-680 (2004).

* cited by examiner

US 7,931,807 B2

METHOD FOR REMOVING CONTAMINANTS FROM GROUND WATER

PRIORITY

This application is a continuation of U.S. application Ser. No. 12/079,778, filed Mar. 28, 2008, now U.S. Pat. No. 7,618, 537 which claims priority to U.S. Provisional Application Ser. No. 60/920,993, filed on Mar. 30, 2007, both of which are hereby incorporated by reference in their entirety.

TECHNOLOGICAL FIELD

The invention is in the field of water treatment, particularly in the removal of nitrate, perchlorate, and other organic contaminates from contaminated water using a membrane biofilm reactor (MBfR).

BACKGROUND

Membrane Biofilm Reactor (MBfR)

Biological denitrification is relatively inexpensive and the final waste product is innocuous nitrogen gas. Perchlorate reduction can be performed using the same or different organisms, and the final waste product is chloride. While well-studied for waste-water treatment, there is relatively little information available regarding the use of biological denitrification and perchlorate reduction for producing drinking water.

Biological denitrification and perchlorate reduction are typically performed on a biofilm formed in a membrane biofilm reactor (MBfR) device, which provide a large surface area for the biofilm and means for contacting the biofilm with liquid and/or gas nutrients and electron donors. MBfR devices support the growth of slow-growing bacteria, such as autotrophs, and are particularly efficient in removing contaminants present at low concentrations, and in removing contaminants to nearly undetectable levels, as required for drinking water applications.

Where the levels of electron donors present in the groundwater are too low to support complete biological denitrification or perchlorate reduction, an organic electron donor (in the case of heterotrophic denitrification) or an inorganic donor (in the case of autotrophic denitrification) can be added to MBfR device for utilization by the biofilm. In the cases of biological denitrification and perchlorate reduction, the electron donor is often hydrogen gas ($H_2$), which is supplied to the biomass via hollow membranes upon which the biofilm forms.

While, biological denitrification and perchlorate reduction have both been performed in MBfR devices, the different redox potentials of these oxidized contaminants, as well as other oxidized contaminants that may be present in the ground water, has heretofore resulted in the sequential oxidation of contaminants based on their redox potential, often resulting in residual levels of toxic compounds with comparatively low redox potentials. Such effluent water is unsuitable for use as drinking water without further treatment to reduce the levels of these residual contaminants.

The need exists for more efficient apparatus and methods for removing oxidized contaminants from ground water using MBfR technology, preferably apparatus and methods capable of simultaneous reduction of a variety of contaminants using a single MBfR device.

REFERENCES

Rittmann, B. E. (1995) *J. Hrubek.* 5B:61-67.
Xu, J. et al. (2003) *Environ. Eng. Sci.* 20:405-22.
Liessens, J. et al. (1993) *J. A WWA* 85:144-54.
Green, M. (1995) *Applied Microbiology and Biotechnology* 43:188-93.
Urbain, V. et al. (1996) *J. A WWA* 88:75-86.
Lazarova, V. Z. et al. (1992) *Water Science Technology* 26:555-66.
Soares, M. I. M. and Abeliovich, A. (1998) *Wat. Res.* 32:3790-94.
Rittmann, B. E. and McCarty, P. L. (2001) *Environmental Biotechnology: Principles and Applications.* McGraw-Hill Book Co., New York.
Banaczak, J. E. et al. (1999) *J. Radioanalytical and Nuclear Chemistry* 241:385-435.
Lee, K. C. and Rittmann, B. E. (2000) *Water Sci. Technol.* 41:219-26.
Lee. K. C. and Rittmann, B. E. (2002) *Wat. Res.* 36:2040-52.
Kurt, M. et al. (1987) *Biotechnology and Bioengineering* 29:493-501.
Dries, D. et al. (1988) *Water Supply* 6:181-92.
Nerenberg, R. et al. (2002) *J. AWWA* 94:103-14.
Adham, S. et al. (2004) *Membrane BioFilm Reactor Process for Nitrate and Perchlorate Removal* in AWWA Research Foundation Report.
Ergas, S. J. and Ruess A. F. (2001) *J. Wat. Suppl. Res & Technol.-AQUA* 50:161-71.
Nerenberg, R. (2003) *Perchlorate removal from drinking water with a hydrogen-based, hollow-fiber membrane biofilm reactor.* Ph.D. Dissertation at Northwestern University.
Loach, P. A. and Fasman, G. D. (Eds.) (1976) *Handbook of Biochemistry and Molecular Biology* ($3^{rd}$ ed.), *Physical and Chemical Data*, Vol. I, pp. 123-30, CRC Press.
*CRC Handbook of Chemistry and Physics* 1st Student Edition, CRC Press, Boca Raton, Fla., USA, 1988.

SUMMARY

The following aspects and embodiments thereof described and illustrated below are meant to be exemplary and illustrative, not limiting in scope. In one aspect, a method for reducing the concentration of oxidized contaminants present in ground water is provided, comprising:

(a) providing an source of contaminated ground water comprising nitrate and perchlorate to an MBfR device;

(b) operating the MBfR device in a recycle mode using the contaminated ground water for a first period of time sufficient to form a biofilm in the MBfR device for performing denitrification in the influent water; and (c) operating the MBfR device in a feed mode using the contaminated water to produce denitrified effluent water;

wherein the denitrified effluent water further comprises reduced levels of perchlorate compared to the influent water.

In some embodiments, the influent water further comprises trichloroethylene (TCE), and the denitrified effluent water further comprises reduced levels of TCE compared to the influent water.

In some embodiments, a chloride material balance calculation is performed to account for the chloride derived from the reduced TCE.

In some embodiments, the influent water further comprises nitroso-dimethyl-amine (NDMA), and the denitrified effluent water further comprises reduced levels of NDMA compared to the influent water.

In some embodiments, the levels of nitrate are substantially undetectable in recycle mode prior to switching to feed mode.

In some embodiments, the method further comprises:

(d) operating the MBfR device in a recycle mode using influent water comprising at least a portion of effluent water from (c) for a second period of time sufficient to acclimate the biofilm to reduce perchlorate; and (e) operating the MBfR device in a feed mode using influent water comprising at least a portion of effluent water from (c) to reduce the levels of perchlorate in the influent water.

In some embodiments, the influent water further comprises trichloroethylene (TCE), and the effluent water from (e) further comprises reduced levels of TCE compared to the influent water of (a).

In some embodiments, a chloride material balance calculation is performed to account for the chloride derived from the reduced TCE.

In some embodiments, the effluent water further comprises nitroso-dimethyl-amine (NDMA), and the effluent water from (e) further comprises reduced levels of NDMA compared to the influent water of (a).

In some embodiments, the method further comprises:

(f) applying the effluent water from (e) to a second MBfR device having a biofilm acclimated to perchlorate reduction; and (g) operating the second MBfR device in a feed mode using as influent water the effluent water from (e) to produce effluent water from the second MBfR device having further reduced levels of perchlorate compared to the effluent water from the MBfR device of (a).

In some embodiments, the levels of perchlorate after (g) are substantially undetectable.

In some embodiments, denitrification and perchlorate reduction are performed by autotrophic bacteria using hydrogen gas as an electron donor.

In some embodiments, the autotrophic bacteria are indigenous to the ground water.

In some embodiments, the ability of the biofilm to perform denitrification in (b) is determined by comparing the concentration of nitrate in the recirculating water in the MBfR effluent water to the concentration of nitrate in the influent water.

In some embodiments, the MBfR device comprises polyester hollow filaments for supporting the biofilm.

In a related aspect, a method for reducing the concentration of contaminants in ground water is provided, comprising:

(a) providing a source of contaminated ground water comprising nitrate, perchlorate, and trichloroethylene (TCE) and/or nitroso-dimethyl-amine (NDMA) to an MBfR device;

(b) operating the MBfR device in a recycle mode using the contaminated ground water for a first period of time sufficient to form a biofilm in the MBfR device for performing denitrification in the influent water, wherein the ability of the biofilm to perform denitrification is determined by comparing the concentration of nitrate in the water in the recycle mode of the MBfR to the concentration of nitrate in the influent water; and (c) operating the MBfR device in a feed mode using the contaminated ground water to produce effluent water reduced in nitrate, perchlorate, and TCE and/or NDMA;

wherein the levels of nitrate, perchlorate, and TCE and/or NDMA are reduced simultaneously.

In some embodiments, the autotrophic bacteria are indigenous to the ground water.

In some embodiments, a chloride material balance calculation is performed to account for the chloride derived from the reduced TCE.

In some embodiments, the autotrophic denitrifying and perchlorate reducing bacteria are the same type of bacteria, which are acclimated to denitrifying and/or perchlorate reduction by operating the MBfR in a recycle mode using ground water from which nitrate and/or perchlorate is to be removed.

In some embodiments, the autotrophic denitrifying and perchlorate reducing bacteria are different types of bacteria, which can be selected to form a biofilm for denitrifying and/or perchlorate reduction by operating the MBfR in a recycle mode using water from which nitrate and/or perchlorate is to be removed.

In another aspect, drinking water is provided, which is produced by simultaneously reducing nitrate and perchlorate contaminants in ground water using an MBfR device adapted to support a biofilm comprising autotrophic denitrifying and perchlorate reducing bacteria.

In some embodiments, simultaneously reducing nitrate and perchlorate contaminants in an MBfR device further includes simultaneously reducing trichloroethylene (TCE).

In some embodiments, a chloride material balance calculation is performed to account for the chloride derived from the reduced TCE.

In some embodiments, simultaneously reducing nitrate and perchlorate contaminants in an MBfR device further includes simultaneously reducing nitroso-dimethyl-amine (NDMA).

In some embodiments, simultaneously reducing nitrate and perchlorate contaminants is performed in a single MBfR device, or a plurality or MBfR devices in fluid communication with a common source of influent water.

In some embodiments, the MBfR or plurality of MBfRs comprise polyester hollow filaments for supporting the biofilm.

In addition to the exemplary aspects and embodiments described above, further aspects and embodiments will become apparent by reference to the drawings and by study of the following descriptions.

DETAILED DESCRIPTION

I. Definitions

Figure 1:
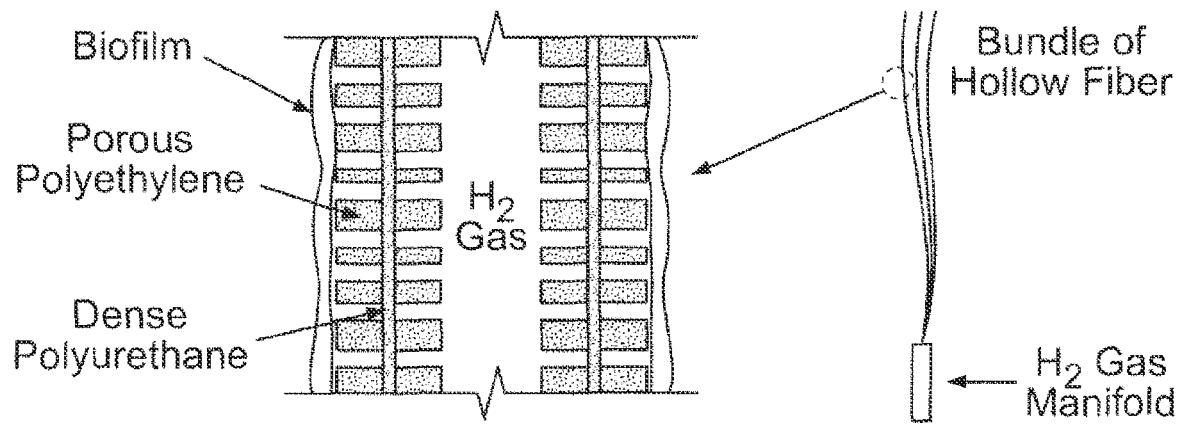
FIG. 1 illustrates a hollow membrane filament in an MBfR device.

Prior to describing aspects and embodiments of the present apparatus and methods, the following terms are defined for clarity. Terms and abbreviations not defined should be accorded their ordinary meaning as used in the art. Note also that singular articles, such as "a" and "an" encompass the plural, unless otherwise specified or apparent from context.

As used herein, the terms "biofilm" or "biomass" refer collectively to microorganisms that grow on the exterior surface of hollow filaments in an MBfR. Such organisms typically affect removal of one or more contaminants present in influent liquid entering the MBfR. A biofilm may include a single type of microorganism or a plurality of different (types of) microorganisms, which may be indigenous to the ground water being treated or inoculated into the ground water or the MBfR device. A biofilm may be a single layer of microorganisms or a plurality of layers of microorganisms. Bacteria are the preferred microorganisms. One skilled in the art will appreciate that biofilms accumulates in an MBfR during setup and operation but are not a "component" of an MBfR device or system, e.g., as provided to an end user.

As used herein, the term "biofouling" refers to the process by which a biofilm/biomass clogs, blocks, or otherwise restricts fluid and/or gas flow in an MBfR apparatus to the point of adversely affecting the operation of the apparatus.

As used herein, "acclimating" a biofilm to reduce a particular contaminant, or chemical class of contaminants, refers to exposing the biofilm to influent water that includes preselected levels of the particular contaminant(s) and, optionally other contaminants to (i) select for microorganisms capable of reducing the particular contaminant, (ii) induce the expression of enzymes in a microorganism capable of reducing the particular contaminant, or (iii) a combination thereof. Acclimation may be accomplished in a feed mode by continuing to pass the influent water comprising the preselected levels of the particular contaminant(s) through the MBfR device until the biofilm is acclimated, or by cycling (recirculating) such influent water through the MBfR device, until the biofilm is acclimated.

As used herein, the terms "inerts" and "inert materials" refer collectively to debris and other material that accumulates in the lumen of the hollow fibers. Such debris and material includes but is not limited to particulate matter present in the gas introduced into the lumen of hollow fibers, liquid and solutes that diffuse into the lumen from the exterior surfaces of the hollow fibers, organisms that grow in the lumen of the hollow fibers, and dust.

As used herein, the term "interleaf" or "interleaf material" refers to a porous, substantially planer material used to separate and maintain the spacing of the hollow filaments. An exemplary material is an open mesh made from recyclable plastic.

As used herein, the term "warp fiber" refers broadly to inert fibers (i.e., fibers not required to support a biomass) that can be combined with hollow filaments to separate and maintain the spacing of the hollow filaments. The warp fibers may be uniformly spaced along the length of the hollow filaments, and may be under sufficient tension to limit the movement of the hollow fibers, which assists in maintaining spacing. Exemplary warp fibers are made from recyclable plastic.

As used herein, a "substantially undetectable" level of a particular contaminant refers to either (i) a level below which the contaminant cannot be detected using a technology approved for water testing, (ii) a numerical concentration as described herein, or (iii) a maximum level established by a regulatory body. Numerical concentrations are less than about 0.2 N-mg/L for nitrate; less than about 0.5 µg/L for perchlorate; less than about 0.5 µg/L for TCE; and less than about 2 ng/L for NDMA. Different definitions may apply to different embodiments, and any one or more of these definitions may be specified by appropriate language or excluded, as in the case of a proviso.

As used herein, "simultaneous" reduction or removal of an oxidized contaminant occurs when a first oxidized contaminant with lower redox potential is reduced by a biofilm, while a substantial amount of a second oxidized contaminant with a higher redox potential remains in the water. A substantial amount is 20%, 30%, 40%, 50%, or more.

As used herein, "treating" ground water refers to decontaminating, or reducing the levels of a contaminant, in the ground water.

As used herein, "drinking water" refers to water suitable for human and/or animal consumption.

As used herein, "oxidized contaminants" are compounds present in ground water that can be reduced by microorganisms to produce partially or fully reduced compounds, preferably having reduced toxicity or reactivity compared to the original oxidized compounds. Exemplary oxidized contaminants are nitrate, nitrite, perchlorate, chlorate, and the like.

As used herein, "different types of microorganisms" are different genera, species, strains, or other genetic variation of a microorganism such as bacteria.

II. Introduction

The present apparatus and methods relate to the removal of oxidized contaminants from ground water using an MBfR device and method. In particular, the apparatus and methods involve treatment of ground water in an MBfR device to reduce nitrate and perchlorate, as well as other oxidized contaminants such as trichloroethylene (TCE) and nitroso-dimethyl-amine (NDMA), to relatively harmless compounds.

An aspect of the apparatus and methods is that contaminants having different redox potentials can be reduced simultaneously. This feature is unexpected, since contaminants with different redox potentials would be expected to be sequentially reduced, beginning with those with the highest redox potential and ending with those with the lowest redox potential.

Another aspect of the apparatus and methods is that a single MBfR device can be used for both nitrate and perchlorate reduction, as well as NDMA, and TCE reduction. The reduction of these contaminants may occur simultaneously or sequentially in a single MBfR device, or in a plurality of MBfR device in communication with common influent source. Where the reduction of the different species occurs sequentially, the biofilm can be allowed to acclimate to contaminants with different redox potentials during the course of decontaminating a batch of influent water. However, the biofilm need not be stripped from the MBfR and a new biofilm reestablished for reduction of a different group of oxidized contaminants.

A further aspect of the apparatus and methods is the use of a chloride material balance calculation to account for the chloride derived from reduced compounds. This ensures that volatile contaminants are reduced to harmless compounds released in effluent water, as opposed to being lost to the atmosphere due to evaporation. This aspect of the apparatus and methods is particularly important with the respect to TCE, which may evaporate from an influent water reservoir prior to reduction in the MBfR device, giving the appearance of destroying the contaminant while actually venting the contaminant to the atmosphere.

In experiments performed in support of the present apparatus and methods, contaminated influent water samples were obtained from the Aerojet Site in Rancho Cordova (Sacramento, Calif., USA). Particular wells at the Aerojet Site have inordinately high concentrations of nitrate, perchlorate, TCE, and NMDA, and ground water from such wells was used to evaluate the performance of the present apparatus and methods.

III. Experiments Performed in Support of the Invention

The following experiments were performed to illustrate features of the present apparatus and methods.

A. Contaminated Water from the Aerojet GET E/F Facility

Water originating from the Aerojet GET E/F Treatment Facility (Sacramento, Calif., USA) contaminated with perchlorate and TCE at levels of 1,600 µg/L and 580 µg/L, respectively, was used in a first test of the MBfR device detailed in Example 1. The MBfR device was operated in a recycle (i.e., 100% recirculation) mode for two days to allow the growth and acclimation of a biofilm in the influent water. After this initial recycling period, the nitrate concentration in the recirculating contaminated water was reduced to less than 0.2 N-mg/L (Table 1), which levels is considered "undetectable." Nitrate contaminants were presumed to be first reduced by the biofilm.

Following the initial period of operation in a recycle mode, the MBfR was operated in a feed mode at a rate of 0.2 to 0.3 mls/minute fresh contaminated influent water. After six days of operation in feed mode, a first effluent water sample was collected and provided to Aerojet for analysis. A second effluent sample was collected following 14 days of operation in the feed mode, and also submitted to Aerojet. The levels of various contaminants in the influent and effluent water are summarized in Table

TABLE 1

Summary of Results using GET E/F water

| Sample # | Mode (Recirc/ Feed) | Recycle Flow Rate (ml/min) | Flow rate ml/min | Hydrogen Pressure (psig) | Time (Days) | $NO_3^1$ (mg/L) | $TCE^2$ (μg/L) | Perchlorate$^2$ (μg/L) | $NDMA^2$ (μg/L) |
|---|---|---|---|---|---|---|---|---|---|
| GET E/F | 0 | 0 | 0 | 0 | 0 | 10 | 580 | 1,600 | 0.071 |
| GET E/F | Recirc | 200 | 0 | 4-5 | 2 | <0.2 | NA | NA | NA |
| GET E/F | Feed | 200 | 0.2-0.3 | 4-5 | 6 | <0.2 | 5 | 190 | 0.044 |
| GET E/F | Feed | 200 | 0.2-0.3 | 4-5 | 14 | <0.2 | 1.2 | <4 | 0.0048 |

$^1$Analysis conducted by Applied Process Technology
$^2$Analyis conducted by Aerojet While the biofilm was monitored only for nitrate reduction while the MBfR was in the recycle mode, it is apparent from the data presented in the Table 1 that perchlorate, TCE, and NDMA were all at least partially reduced in the effluent water (compared to the influent water) when the MBfR device was operated in the feed mode. These results are the first to show the simultaneous reduction of nitrate, perchlorate, TCE, and NDMA present in ground water. The results were unexpected based on the redox potentials of the various contaminants, based on which one would expect the complete reduction of nitrate prior to the complete reduction of perchlorate. TCE has the lowest redox potential and should presumably not be reduced until all contaminants with higher redox potentials are reduced (Loach, P. A. and Fasman, G. D. (Eds.) (1976) *Handbook of Biochemistry and Molecular Biology* (3rd ed.), *Physical and Chemical Data, Vol.* 1, CRC Press. pp. 123-30). However, TCE appeared to be reduced while the levels of other contaminants, such as perchlorate, were still detectable.

B. Contaminated Water from Well 3673 (First Sample)

To further evaluate the ability of the test MBfR device to simultaneously remove different contaminants present in ground water, a second sample of water was received from Well 3673 at the Aerojet site. Well 3673 has particularly high concentrations of TCE (32,000 μg/L) and perchlorate (28,000 μg/L).

As above, the MBfR was first operated in a recycle mode until the nitrate levels were non-detectable, and then operated in a feed mode using fresh influent water from Well 3673. Following three days of operation in a recycle mode, the nitrate concentration was non-detectable (i.e., less than 0.2 N-mg/L). After feeding fresh water from Well 3763 for 10 days, effluent samples were taken and analyzed for TCE and perchlorate (Table 2). A second effluent sample was taken after 29 days and a final effluent sample was taken after 38 days.

As shown in Table 2, the concentrations of both TCE and perchlorate in the effluent water appeared to decrease, suggesting simultaneous reduction of contaminants having different redox potentials. However, analysis of the influent water for TCE on day 38 indicated that that the TCE concentration had been fallen, e.g., by evaporation or by some other mechanism. While the perchlorate concentration in the influent water on day 38 was not analyzed, perchlorate would not be expected to evaporate or degrade as in the case of TCE.

Despite the evaporation of TCE from the influent water applied to the MBfR device, a significant amount of TCE was also reduced by the biofilm. Based on the data in Table 2, a period of time of from about 29 to about 38 days appears to be required to acclimate the microorganisms in the biofilm for metabolism of TCE and perchlorate, and or allow the growth of organisms capable of metabolizing TCE and perchlorate.

TABLE 2

Summary of Results using water from well 3673

| Sample # | Mode (Recirc/ Feed) | Recycle Flow Rate (ml/min) | Flow rate ml/min | Hydrogen Pressure (psig) | Time (Days) | $NO_3^1$ (N · mg/L) | $TCE^2$ (μg/L) | Perchlorate$^2$ (μg/L) |
|---|---|---|---|---|---|---|---|---|
| Well 3670 | 0 | 0 | 0 | 0 | 0 | 12 | 32,000 | 28,000 |
| Well 3670 | Recirc | 200 | 0 | 4-5 | 3 | <0.2 | NA | NA |
| Well 3670 | Feed | 200 | 0.2-0.3 | 4-5 | 10 | <0.2 | 33 | 17,000 |
| Well 3670 | Feed | 200 | 0.2-0.3 | 4-5 | 29 | <0.2 | 21 | 150 |
| Well 3670 | Feed | 200 | 0.2-0.3 | 4-5 | 38 | <0.2 | 6.8$^3$ | 400 |

$^1$Analysis conducted by Applied Process Technology
$^2$Analyis conducted by Aerojet
$^3$Influent TCE concentration analysed and found to be 52 μg/L C. Contaminated Water from Well 3673 (Second Sample)

Following the successful reduction of high concentrations of perchlorate and TCE in the water from Well 3673, a second sample of this contaminated water was provided for testing. To reduce the evaporation of TCE, the sample reservoir was changed from plastic to glass and sealed with aluminum foil.

To account for the contaminants present in the influent water in the analysis of the effluent water, total chloride levels were measured in the effluent water and compared to total chloride levels in the influent water, thereby allowing the calculation of chloride material balance. In this manner, the chloride present in the effluent water could attributed to either the reduction of perchlorate or the reduction of TCE. In addition, the levels of contaminants present in the influent water (particularly TCE) were monitored over the course of the test to account for losses due to evaporation or other mechanisms. A summary of the results from this second test using water from Well 3673 is presented in Table 3.

TABLE 3

Summary of results using water from well 3673 (second run)

| | Days | | | | | |
|---|---|---|---|---|---|---|
| | 12 | | 24 | | 30 | |
| | Influent | Effluent | Influent | Effleunt | Influent | Effluent |
| | | | Sample ID | | | |
| | (122105-0) | (122105-12) | (122105-0B) | (122105-24) | (122105-0C) | (122105-30) |
| | Inorganics (mg/L)[1] | | | | | |
| Perchlorate | 28 | 0.61 | 29 | 0.075 | 23 | 0.072 |
| F | 0.091 | 0.1 | 0.086 | 0.098 | 0.1 | 0.093 |
| Cl | 8.6 | 21 | 8.9 | 20 | 8.5 | 20 |
| $NO_2$ | ND | <0.05 | 0.37 | NR | 0.58 | <0.05 |
| Br | <0.10 | <0.1 | <0.10 | 0.1 | 0.11 | 0.11 |
| $NO_3$ | 13 | <0.1 | 12 | <0.1 | 11 | <0.1 |
| $PO_4$ | 0.49 | <0.30 | 0.45 | 0.31 | 0.51 | <0.30 |
| $SO_4$ | 9.9 | 9.6 | 10 | 7.5 | 9.9 | 7.5 |
| | Organic (µg/L)[1] | | | | | |
| TCE | 15,000 | 170 | 6,600 | 330 | 3100 | 160 |
| 1,1-DCEe | 82 | 2.0 | 51 | 4.2 | <10 | <0.5 |
| 1,2-DCEe | 36 | 4.4 | 30 | 7.5 | <10 | 0.52 |
| $CH_2Cl_2$ | 290 | <0.5 | <0.5 | <0.5 | <10 | <0.5 |
| $CHCl_3$ | ND | 1.8 | 12 | 3.3 | <10 | <0.5 |
| 1,1-DCEa | ND | 0.74 | 3 | 0.73 | <10 | <0.5 |
| 1,2-DCEa | ND | 1.5 | 5.6 | 2.5 | <10 | <0.5 |

[1]All analysis conduct by Aerojet

As shown in Table 3, the concentration of TCE and other chlorinated solvents in influent water decreased over time. The initial TCE concentration in the influent to the MBfR was 15,000 µg/L and after 30 days had fallen to 3,100 µg/L. Nonetheless, as above, a significant reduction in the concentration of the TCE and other chlorinated solvents occurred in the MBfR device. Interestingly, no increase in the concentrations of 1,2-dichloroethylene (1,2-DCE) or vinyl chloride were observed from the reduction of the TCE, as previously reported. The chloride concentration of all effluent samples increased from about 8.5 mg/L to about 20 mg/L, which was consistent with perchlorate and TCE reduction.

A more detailed analysis of the chloride levels in the influent water, in which chloride material balance was determined by calculating the chloride concentration resulting from perchlorate and TCE reduction to chloride, is summarized in Table 4. The sum of the amount of chloride produced from the reduction of perchlorate and TCE, plus the chloride initially present in the water, should correspond to the amount of chloride present in the effluent water.

TABLE 4

Chloride material balance

| Days | 12 | 24 | 30 |
|---|---|---|---|
| Chloride from perchlorate (mg/L) | 9.77 | 10.32 | 8.18 |
| Chloride from TCE (mg/L) | 13.22 | 5.59 | 2.62 |
| Total Chloride from perchlorate and TCE (mg/L) | 22.99 | 15.91 | 10.80 |
| Chloride in MBfR Infleunt (mg/L) | 8.6 | 8.9 | 8.5 |
| Calculated Chloride (mg/L) | 31.59 | 24.81 | 19.30 |
| Chloride in MBfR Effleunt (mg/L) | 21 | 20 | 20 |
| Chloride Material Balance | 66.5% | 80.6% | 103.6% |

As shown in Table 4, after 12 days of MBfR operation, the chloride concentration in the influent water resulting from perchlorate reduction was calculated to be 9.77 mg/L, while the chloride concentration in the effluent water resulting from TCE reduction was calculated to be 13.22 mg/L. The total chloride concentration in the influent water was 31.59 mg/L. The total chloride concentration in the MBfR effluent water on day 12 was 21 mg/L, thus the chloride in the effluent water accounted for only 66.5% of the expected amount of chloride. However, the chloride balance was 103.6% at day 30, suggesting that all the chloride produced by the reduction of the perchlorate and TCE was ultimately accounted for by the chloride material balance calculation.

D. Summary of Results

The results described above indicate that an MBfR device and method can be used to reduce nitrate, perchlorate, NDMA, and TCE in contaminated ground water. The MBfR device was even effective in removing these contaminants from influent water from Well 3673, which has particularly high levels of perchlorate and TCE contamination. Measuring the chloride material balance in influent and effluent water confirmed the reduction of both perchlorate and TCE to chloride; nonetheless, the results suggest that TCE loss to evaporation should be considered in testing and designing water treatment devices and methods to avoid the excessive loss of such contaminants to the atmosphere prior to reducing them to less harmful compounds. 1,2-DCE and vinyl chloride were not detected, suggesting that TCE is not broken down into these compounds as previously suggested.

While the reduction in nitrate, perchlorate, TCE, and NDMA was substantial in all tests, the levels of perchlorate and TCE were not reduced to non-detectable levels, presumably because these compound have a lower redox potential than other contaminants present in the influent water (e.g., nitrates). A non-detectable level for perchlorate is less than about 4 µg/L and a non-detectable level for TCE is less than about 0.5 µg/L. Thus, while simultaneous reduction of nitrate, perchlorate, and other oxidized contaminants was observed, the complete reduction of perchlorate and TCE may require two MBfR devices operating in series, wherein the first MBfR device reduces the concentration of perchlorate and TCE by about 95%, and the second MBfR device further reduces the concentrations of perchlorate and TCE to non-detectable levels.

As discussed, a period of time is required to allow a biofilm to develop from indigenous microorganisms in an MBfR device. In the tests performed above, the MBfR was operated in a recycle mode during this period of time to allow microorganisms to acclimate to the nutrient conditions and/or grow to sufficient density to allow operation of the MBfR device in a feed mode. The acclimation time required to achieve complete nitrate reduction was only about two to about three days. The acclimation time for perchlorate reduction was about 24 days. The acclimation time for TCE reduction appears to be about 30 to about 38 days. However, while such times represent the acclimation periods for optimal contaminant reduction, nitrate, perchlorate, TCE, and NDMA were all reduced simultaneously, at least to some extent, following acclimation of the MBfR device for nitrate reduction.

Notably, some sulfate appeared to have been reduced, presumably to sulfide, although the odor of hydrogen sulfide was not apparent in the effluent water from the MBfR device. Since the redox potential of sulfate is even lower than the redox potential of perchlorate, this observation further supports the simultaneous reduction of contaminants having different redox potentials, rather than the sequential reduction of contaminants in order of redox potential.

These results of the above-described experiments demonstrate that reduction of nitrate, perchlorate, TCE, and NDMA are not mutually exclusive and all these contaminants can be reduced simultaneously in a single MBfR device. This result is surprising since conventional wisdom holds that the oxidized contaminant species with the highest redox potential should be completely reduced before there is significant reduction of contaminant species with lower redox potentials.

IV. Contaminants and Microorganisms

A. Contaminants

The present apparatus and methods have largely been exemplified for reduction of particular oxidized contaminants present in ground water, such as nitrate, perchlorate, TCE, and NDMA, although they can be used to reduce a variety of oxidized contaminants present in ground water.

Trichloroethylene (TCE) is a sweet-smelling, colorless, non-flammable liquid with the formula empirical formula $C_2HCl_3$ and the following structure:

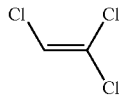

TCE is used to degrease metals, as an extraction solvent for oils and waxes, in dry cleaning, as a refrigerant, and as a fumigant. TCE was originally used as an anaesthetic and an analgesic in obstetrics until its carcinogenic and mutagenic properties were recognized. Upon ingestion, TCE is readily decomposed into toxic compounds such as 1,2-dichloroacetylene and trichloroacetic acid. The State of California (USA) has set a maximum permissible level for TCE in drinking water of 5 ppb.

N-nitrosodimethylamine (NDMA) is a carcinogenic, mutagenic, and teratogenic disinfection by-product of chloramine treatment The State of California (USA) has set a maximum permissible level of NDMA in drinking water of 10 ng/L. NDMA is an odorless, yellow, oily volatile liquid with the empirical formula $C_2H_6N_2O$ and the following structure:

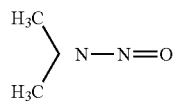

Other oxidized contaminants that can be removed instead of, or in addition to, the exemplified contaminants include, but are not limited to, nitrite, chlorate, bromate, halogenated organic contaminants, other N-nitrosamines, inorganic oxyanions such as selenate, chromate, and arsenate, organic solvents and pesticides, such as tetrachloroethylene (PCE), trans 1,2-dichloroethylene (trans-DCE), dichloromethane (DCM), chloroform (CF); nonylphenol (NP), triclosan (TCS), Bisphenol-A (BPA), and estradiol equivalents (EEQ).

B. Microorganisms

The apparatus and methods have also been exemplified using bacteria indigenous to the waste water being treated. Typically, a plurality of different types of bacteria is present in the influent water, although the present methods contemplate the use of a single type of bacteria. In some cases, the same bacteria may reduce nitrate and perchlorate. In other cases, different bacteria may reduce nitrate and perchlorate.

The types of bacteria present in a biofilm may change over time. For example the population may include predominantly denitrifying bacteria when nitrate concentrations are high and may include predominantly perchlorate reducing bacteria when nitrate concentrations are low. The composition of a biofilm may be intentionally changed, e.g., by recirculating water having particular known levels of a nitrate, perchlorate, other preselected contaminants to acclimate the biofilm to reducing a particular contaminant species.

The use of bacteria indigenous to the ground water has the advantage that such bacteria are already adapted to the available nutrients. However, where the ground water is essentially sterile, where indigenous bacteria fail to acclimate to the MBfR environment, where a large initial inoculum of bacteria into an MBfR device is desired, or where more precise control of the types and amounts of bacteria present in a biofilm is desired, one or more types of microorganisms can be introduced (i.e., inoculated) into the influent water and/or MBfR device. Examples of such microorganisms are described, below.

Autotrophic Denitrification Systems

Autotrophic denitrification and perchlorate reduction using hydrogen as an electron donor has been described. Hydrogen gas ($H_2$) is capable of releasing a pair of electrons per mole, enabling the full reduction of nitrate and perchlorate according to the following equations:

$$H_2 \rightarrow 2H^+ + 2e^- \quad (1)$$

$$2.5H_2 + NO_3^- \rightarrow 0.5N_2 + 2H_2O + OH^- \quad (2)$$

$$2H_2 + ClO_4^- \rightarrow Cl^- + O_2 + 2H_2O \quad (3)$$

The reduction of nitrate and perchlorate are believed to proceed as follows:

$$NO_3^- \rightarrow NO_2^- \rightarrow NO \rightarrow N_2O \rightarrow N_2 + O_2 \quad (4)$$

$$ClO_4^- \rightarrow ClO_3^- \rightarrow ClO_2^- \rightarrow Cl^- + O_2 \quad (5)$$

Redox potential for each of these reactions can be found in an appropriate reference manual, such as the *CRC Handbook of Chemistry and Physics*, published by CRC Press, Boca Raton, Fla., USA and the *Handbook of Biochemistry and Molecular Biology* (3$^{rd}$ ed.), *Physical and Chemical Data*, Vol. I, CRC Press.

Hydrogen-oxidizing bacteria include both hydrogen-oxidizing, autotrophic bacteria and bacteria able to utilize organic carbon and other energy sources in addition to hydrogen. Hydrogen-oxidizing bacteria are preferred in some embodiments of the present apparatus, systems, and methods. In the presence of oxidized contaminants, such bacteria reduce an oxidized form of a primary electron acceptor in a sufficient amount to sustain a viable, steady-state biomass within the aqueous water-treatment system. Deriving energy for growth via reduction is referred to as a dissimilatory reduction. Examples of hydrogen-oxidizing bacteria include but are not limited to *Pseudomonas pseudoflava, Alcaligenes eutrophus, Alcaligenes paradoxus, Paracoccus denitrficans*, and *Ralstonia eutropha*, which can all used nitrate, and a *Dechloromonas* strain, which can use perchlorate.

The use of hydrogen gas an electron donor has several major advantages, for example, (i) $H_2$ is the least expensive donor per equivalent of electrons supplied, (ii) $H_2$ is non-toxic to humans, (iii) $H_2$ is evolved from water open to the surface, thereby eliminating residue that could cause biological instability or disinfection byproducts in drinking water, and (iv) $H_2$ supports the growth of autotrophic bacteria, which do not need an organic carbon source.

Autotrophic denitrification of NDMA using $H_2$ as an electron source is believed to proceed through a three-step reduction with the final waste products being ammonia and dimethylamine.

Heterotrophic Degradation of Nitrate and Perchlorate

Heterotrophic processes for nitrate and perchlorate reduction have used ethanol, acetate, or methanol as an electron-donor supplement (Liessens, J. et al. (1993) *J. AWWA* 85:144-54; Green, M. (1995) *Applied Microbiology and Biotechnology* 43: 188-93; Urbain, V. et al. (1996) *J. AWWA* 88:75-86). Ethanol and methanol are alcohols that are federally regulated, and methanol has acute health risks. Acetate, wheat straw, and corn syrup have been used but may leave donor residuals in the treated water due to overdosing or fluctuations in the influent nitrate concentration. Such residuals encourage organism growth in downstream distribution systems, causing numerous problems, including increased plate counts, unpleasant taste and odor, accelerated corrosion, and decreased flow capacity. As a result, water treatment systems utilizing heterotrophic donors typically require post-treatment to produce biologically stable water.

Removal of nitrogenous contaminants is usually performed by denitrifying bacteria or "nitrifiers", which include two major groups of aerobic, chemolithoautotrophic bacteria. Ammonia-oxidizing bacteria oxidize ammonia to nitrite, and nitrite-oxidizing bacteria (NOB) oxidize nitrite to nitrate. The first process is performed by a number of facultative anaerobes commonly found in soil. The second process, sometimes referred to as "true" denitrification, is performed by a more select group of bacteria exemplified by *Paracoccus denitrificans, Alcaligenes eutrophus, Alcaligenes paradoxus, Pseudomonas pseudoflava, Vibrio dechloraticans* Cuznesove B-1168, *Acinetobacter thermotoleranticus, Ideonella dechloratans*, GR-1 (a strain identified to belong to the β-Proteobacteria, *Paracoccus denitrificans, Wolinella succinogenes*, and *Ralstonia eutropha*. *Pseudomonas pseudoflava, Alcaligenes eutrophus, Alcaligenes paradoxus, Paracoccus denitrificans*, and *Ralstonia eutropha* can all use hydrogen gas as an electron donor. *Ralstonia eutropha* is a preferred bacteria available from the American Type Culture Collection (ATCC; Manassas, Va., USA) as collection number 17697.

Perchlorate-reducing bacteria are generally facultative anaerobes or microaerobes. The bacteria use acetate, propionate, isobutyrate, butyrate, valerate, malate, fumerate, lactate, chlorate, and oxygen as electron donors but typically not methanol, catechol, glycerol, citrate, glucose, hydrogen, sulfate, selenate, fumerate, malate, Mn(IV), or Fe(III). Most perchlorate-reducing bacteria are Proteobacteria. *Dechloromonas, Dechlorosoma*, and strain GR-1 are β-Proteobacteria, while *Azospirillum* is an α-Proteobacteria. Strains of *Dechloromonas* and *Dechlorosoma* can use lactate as an electron donor, and strains of *Dechlorosoma* can use ethanol as an electron donor. With the exception of three *Dechloromonas* strains, all perchlorate-reducing bacteria can use nitrate as an electron acceptor.

Despite its drawbacks, the true yield (Y) of denitrification, expressed as grams dry weight (DW) per gram oxygen demand (OD) of electron donor, is significantly higher in heterotrophic denitrification than in autotrophic denitrification. For example, the yield for heterotrophic denitrification utilizing acetate is 0.225 g DW/g OD donor, while the yield for autotrophic denitrification utilizing 12 is 0.107 g DW/g OD donor. An advantage of higher yield is faster growth and, consequently, shorter startup times. A disadvantage of higher growth is that the biomass must be partially wasted from the system by backwashing or gas sparging, or by maintaining sufficient flow velocity or turbulence in the reactor to prevent the overgrowth of the biomass, which leads to clogging and poor flow characteristics.

With respect to other oxidized contaminants, autotrophic denitrification of NDMA believed to proceed through a three-step reduction with the final waste products being ammonia and dimethylamine. Autotrophic denitrification of TCE is believed to yield 1,2-DCE and vinyl chloride, although the results described herein suggest than different reduced products may be produced. TCE is also reduced by iron-reducing bacteria and sulfate-reducing bacteria, which are found in soil.

V. Materials for Use in MBfR Devices

A. Membrane Materials

One type of membrane for use in the present MBfR device and method is hollow-filament membrane, as described for use in denitrification (Ergas, S. J. and Ruess, A. F. (2001) *J. Wat. Suppl. Res & Technol.-AQUA* 50:161-71), perchlorate reduction (Nerenberg, R. (2003) Ph.D. Dissertation at Northwestern University), and TCE reduction to ethane and chloride. Using such membranes, $H_2$ gas is diffused through the walls of a the hollow filaments, which are sufficiently porous to allow the diffusion of $H_2$ gas through the walls of the filaments, while being sufficiently non-porous so as to allow the use of long continuous filaments, while ensuring sufficient $H_2$ pressure in the distal end of the hollow filaments.

The illustration in FIG. 1 shown a hollow filament containing a 1-μm thick nonporous, hydrophobic polyurethane layer sandwiched by micro-porous polyethylene walls. The dense polyurethane layer allows slightly pressurized gas to diffuse through the membrane without forming bubbles. Biofilm naturally grows on the outside wall of the membrane filaments. The $H_2$ electron donor meets the contaminant electron acceptor at that interface. Because of the counter-current transport of $H_2$ and the oxidized contaminant in the biofilm, the $H_2$ utilization efficiency can be nearly 100%, which enhances the economics and prevents forming an explosive atmosphere above the water.

Hollow filaments may be made from a variety of gas-permeable, substantially liquid impermeable materials, including polyester, polyethylene, polypropylene, polyurethane, cellulose triacetate (CTA), Rayon® (a regenerated cellulosic fiber), and composites, thereof:

The hollow filaments may be individual filaments, filaments arranged in tows or bundles, or filaments provided in a "tube sheet," wherein multiple substantially parallel filaments are imbedded in a sheet that can be folded or rolled up to provide MBfR filaments in layers of a desired density. The potted ends of the filaments may be machined to ensure that the filaments are open and available to conduct gas. In some embodiments, the hollow filaments can be manipulated as a modular unit (i.e., "module") for cleaning or replacement.

One class of compounds useful for the production of long hollow filaments for use in continuous flow MBfR devices is the polyesters. Esters are a class of organic compounds traditionally formed by the condensation of an alcohol and an organic acid. Where the acid is a carboxylic acid, the resulting ester has the structure $R^1$—C(=O)$OR^2$, where $R^1$ and $R^2$ are independently H or myriad functional groups. Esters can also be formed from phosphoric, sulfuric, nitric, boric, benzoic, and other acids. Cyclic esters are known as lactones.

Esters participate in hydrogen bonding as hydrogen-bond acceptors. However, esters do not function as hydrogen donors. This allows esters groups to form hydrogen bonds with many other functional groups, while precluding hydrogen-bonding between esters groups. Esters are generally hydrophobic, although the nature of the $R^1$ and $R^2$-groups affects the characteristics of a particular ester.

Polyester is a polymer of one or more preselected ester monomers, typically produced by azeotrope esterification, alcoholic transesterification, acylation (i.e., the HCl method), the silyl or silyl acetate method, or the ring-opening method, and variations, thereof, depending on the particular polyester. Polyester is widely used in the manufacture of consumer products, and its mechanical properties are well known.

Polyesters include but are not limited to poly(ethylene terephthalate) (PET), poly(trimethylene terephthalate) (PTT), poly(butylene terephthalate) (PBT), poly(ethylene naphthalate) (PEN), poly(cyclohexylene dimethylene terephthalate) (PCTA), polycarbonate (PC), poly(butylene naphthalate) (PBN), and poly(lactic acid) (PLA). Polyesters may be homopolymer or heteropolymers. As used herein, heteropolymers include copolymers. A common polyester co-polymers is 1,4-cyclohexanedimethanol (CHDM). For example, PCTA is a copolymer of three monomers, which are terephthalic acid, isophthalic acid, and CHDM. While some industries use the terms "polyester" and "PET" almost interchangeably, the term "polyester" refers to the entire class of compounds.

Many of the advantages of polyester are most apparent when filaments are tossed or woven into tows, ropes, fabrics, etc. For example, polyester is widely used in the textile industry. The most widely used polyester is PET (or PETE), which exists in amorphous (transparent) and semi-crystalline (white or opaque) forms and is readily made into filaments and sheets. PET and another polyester of a dihydric alcohol and terephthalic acid are commonly used to make rope.

In addition to being inexpensive to produce, polyesters are particularly strong, resilient, resistant to abrasion, and resistant to stretching and shrinking. Polyester textiles are wrinkle resistant, mildew resistant, fast drying, and retain heat-set pleats and creases. Polyester displays excellent resistance to oxidizing agents, cleaning solvents, and surfactants. While resistant to sunlight, UV stabilizers are typically added for use outdoors or exposed to UV light.

Polyesters, like most thermoplastics, are recyclable and may be may be virgin polyesters, recycled polyesters, post consumer polyesters, recycled monomers, or combinations and variations, thereof. Some polyesters, including PET, offer the additional advantage of containing only carbon, oxygen, and hydrogen (i.e., no sulfur, phosphorus, nitrogen, etc.), which makes them candidates for incineration.

Exemplary polyester hollow filaments are made of melt-spinnable polyester, such as PET, that is melted and pressed through a hole of a spinneret, quenched in water or in an air stream, stretched in one or more steps in combination with heating, and then wound onto on a spool using a winding machine. The hollow filaments are fine, effectively "endless" flexible hollow polyester tubes, which can be cut to any length as needed. The filaments having an exterior surface that is typically exposed to the wastewater, and an interior surface for interacting with sparged gas. The interior surface defines a hollow interior space. Other polymer materials can be similarly spun to produce long hollow filaments.

The preferred diameter of the hollow filaments for use in the continuous flow MBfR depends on the particular embodiment. The hollow filaments may be less than 500 μm in diameter, less than 300 μm in diameter, less than 200 μm in diameter, or even less than 100 μm in diameter. The filaments may even be less than 50 μm, less than 20 μm, or even less that 10 μm in diameter. The hollow filaments may have a uniform diameter or be heterogeneous with respect to diameter. Where the filaments are of heterogeneous diameter, the diameter may fall within a preselected range. The pore size of the filaments should such that the walls of the filaments are gas permeable but substantially water impermeable. An exemplary pore is about 0.1 to 0.15 μm.

The hollow filaments may be tossed into bundles to form multifilament yarns, which are then assembled into modules for use in a bioreactor, to be described. Filaments of less than 10 dtex (i.e., decitex=1 gram per 10,000 meters) are preferred for yarns, while filaments of more than 100 dtex are typically used as monofilaments. Intermediate filaments are used in either form. Both mono and multifilaments can be used as warp or weft in technical fabrics.

The diffusion of gas through a polymer membrane is generally described by Fick's laws of diffusion. The solubility coefficient depends on the particular polymer-gas combination and Henry's law. The permeation of low molecular weight gases in rubbery polymers (below their glass transition temperatures) at moderate pressures is Fickian and follows Henry's law for different sorption modes (i.e. absorption, the adsorption, plus trapping in microvoids, clustering, and aggregation). Klopffer, M. H. and Flaconnèche, B., Oil & Gas Science and Technology—Rev. IFP, 56, 2001, No. 3).

The burst pressure of a hollow filament can be calculated using Equation 6:

$$P = T \cdot (OD^2 - ID^2)/(OD^2 + ID^2) \quad (6)$$

where P is burst pressure, T is tenacity, and OD and ID are outside and inside diameter, respectively. OD and ID are preselected variables and tenacity is a constant associate with a particular polymer.

Preferred filament diameters for use as described are from about 50 μm to about 5,000 μm (OD), or even from about 0.10 mm to about 3,000 μm. One preferred diameter is about 300 μm. The optimal shape of hollow filaments is round, although irregular shaper are expected to produce satisfactory results. Consistent density is preferred but not required. Preferred tenacity (T) values are from about 10 to about 80 cN/tex, or even from about 20 to about 60 cN/tex.

Percent void volume (% V) may be calculated using Equation 7:

$$\% V = T \cdot (\text{inside area})/(\text{outside area}) \times 100 \quad (7)$$

An acceptable range for void volume is from about 1% to about 99%, while a preferred range for some embodiments is from about 25% to about 50%.

B. Warp Fibers and Interleaf Materials

Hollow filaments may be combined with warp fibers, interleaf material, or both. Warp fibers are substantially inert, structural fibers or filaments that are typically orientated perpendicular to the hollow filaments. Interleaf material is generally in the form of a porous sheet used to separate layers of hollow filaments.

Warp fibers and interleaf materials can be made of polyester, polypropylene, polyethylene, polyurethane, cellulose triacetate, and composites, thereof. Preferred warp fiber have an outside diameter of about 100-500 µm, about 150-450 µm, or about 200-400 µm. In one example, the warp fiber is 150 denier textured polyester having an outside diameter of about 300 µm and an inside diameter of about 150 µm. Other dimensions and a range of from about 75 to about 300 denier texture polyester should produce similar results.

Warp fibers should have some elasticity to allow the filaments to flex and expand, although the amount is not critical. The warp fibers may be spaced at intervals along the length of the hollow filaments. The tension of the warp fibers may be sufficient to maintain the position of the groups of hollow filaments, minimizing the deflections and movement of the filaments under operating conditions; however, the filaments may be able to flex and expand. The filaments may be arranged into groups and then combined with warp fibers. Each group may include from 2 to about 200 filaments.

Similarly, interleaf material may be made of an inert plastic material such as of polyester, polypropylene, polyethylene, polyurethane, cellulose triacetate, and composites, thereof. Interleaf material should be sufficiently porous to permit radial flow in an MBfR without significant restriction. Interleaf material may be made from woven fibers, perforated sheets, or expanded materials. Exemplary interleaf material is an extruded polypropylene diamond net. A particular net has a nominal hole size of 0.110 inches×0.110 inches, a thickness of 0.046 inches, and a nominal open percentage of 66%.

While the present apparatus and methods have been described with reference to several embodiments, it will be appreciated that features and variations illustrated or described with respect to different embodiments can be combined in a single embodiment. These and other applications and implementations will be apparent in view of the disclosure. Such modifications, substitutions and alternatives can be made without departing from the spirit and scope of the invention, which should be determined from the appended claims.

VI. EXAMPLES

The following Examples are provided to illustrate the present apparatus and methods and are in no way intended as limiting.

Example 1

Test Equipment

The specifications of the exemplary bench-scale MBfR reactor used in the experiments described herein are provide in Table 5.

TABLE 5

MBfR device specifications

| Item | Value | Unit |
|---|---|---|
| Active Length (vertical portion) | 25 | cm |
| Shell Inside Diameter | 0.6 | cm |
| Cross Sectional Area | 0.28 | cm$^2$ |
| Active Volume (vertical portion) | 7.07 | cm$^3$ |
| Number of fibers | 32 | |
| Total Surface area of fibers | 70.4 | cm$^2$ |
| Typical feed flow rate | 0.2 | ml/min |
| Typical detention time (empty-bed) | 35 | min |
| Typical recycle flow | 150 | ml/min |
| Typical recycle ratio | 750 | |

Figure 2:
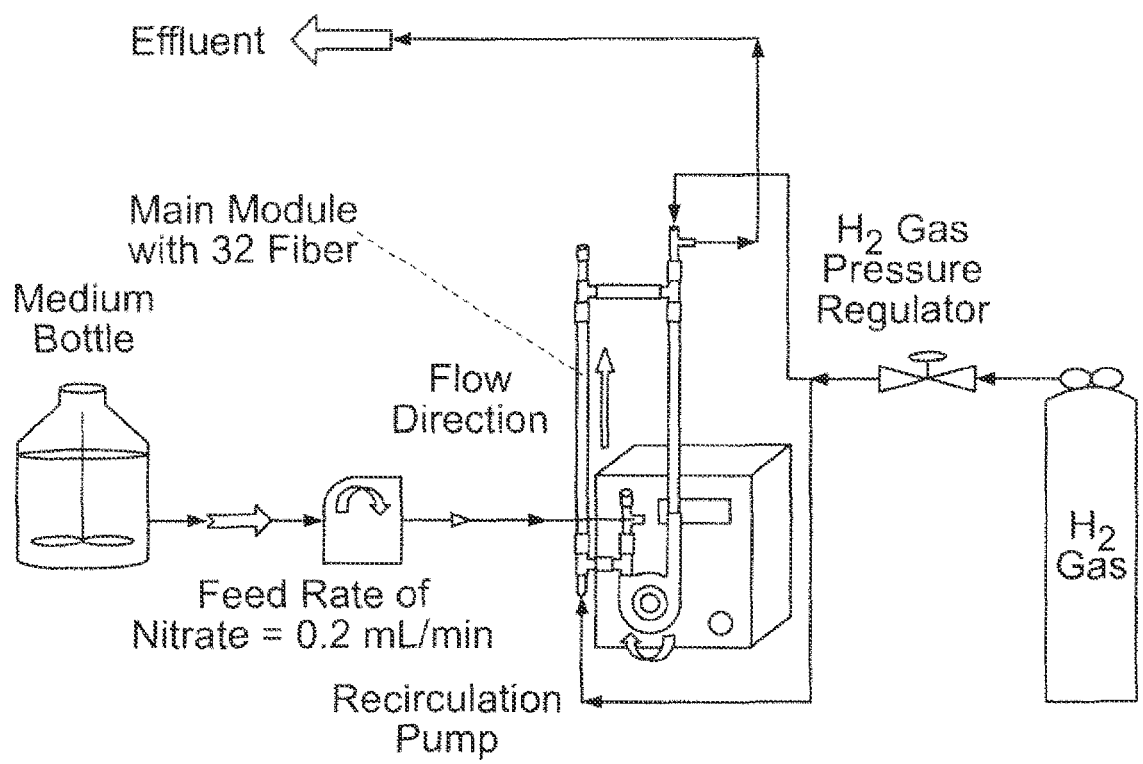
FIG. 2 illustrated the bench-scale MBfR apparatus used in experiments.

A schematic of the exemplary bench-scale MBfR device and system is shown in FIG. 2. The MBfR system consisted of two glass tubes connected with Norprene tubing and plastic barbed fittings. One glass tube contained a main bundle of 32 hollow-filament membranes (Model MHF 200TL, Mitsubishi Rayon), each 25 cm long. The high recirculation rate of each reactor (i.e., 150 mL/min) promoted complete mixing and helped control biomass accumulation on the filaments. A manifold peristaltic manifold pump was used with PVC tubing to achieve a feed rate of about 0.2-0.3 mL/min. The standard hydrogen pressure for the reactors was 4-5 psi.

Example 2

Water Treatment Procedures

Water samples obtained from the Aerojet Facility were logged and refrigerated until used as described herein. The MBfR device described in Example 1 was operated in either a recycle (i.e., recirculating) mode or a feed mode. In the recycle mode, water was recirculated in the MBfR to allow the indigenous microorganisms to acclimate to the nutrient conditions and/or attach to the membrane filaments. The recirculation rate was about 200 ml/min but could be scaled appropriately to suit different MBfR devices. Operation in the recirculating mode was stopped when the nitrate concentration in the recirculating water became non-detectable (i.e., less than about 0.2 $NO_3$—N mg/L).

In the feed mode, fresh contaminated water was continuously fed into the MBfR, with a corresponding release of treated/decontaminated effluent water. The feed rate was about 0.2 to about 0.3 mls/min with the recirculation rate being maintained at about 200 ml/min. These rates can be adjusted to suit the particular apparatus used. Once the MBfR was operated in the feed mode, samples were collected periodically at preselected times and send to Aerojet for analysis of perchlorate and/or TCE or analyzed for these or other contaminants at Applied.

Example 3

Analytical Testing

The pH of influent or effluent water was measured with an Oakton Model Ph Tester 3'. The nitrate concentration of influent or effluent water was measured using a HACH Model #820 and a Nitraver 5 test reagent (Mach Company, Loveland, Colo., USA). Perchlorate and TCE levels were measured by Aerojet using standard procedures.

What is claimed is:

1. A method for reducing the concentration of oxidized contaminants present in ground water comprising:
   (a) providing a source of contaminated ground water comprising nitrate and perchlorate to an MBfR device;
   (b) operating the MBfR device in a recycle mode, using the contaminated ground water, for a first period of time sufficient to form a biofilm in the MBfR device for performing denitrification in the influent water, wherein the MBfR device comprises hollow filaments for supporting the biofilm; and
   (c) operating the MBfR device in a feed mode, using the contaminated water, to produce denitrified effluent water;
   wherein the denitrified effluent water further comprises reduced levels of perchlorate compared to the influent water.

2. The method of claim 1, wherein the influent water further comprises trichloroethylene (TCE), and the denitrified effluent water further comprises reduced levels of TCE compared to the influent water.

3. The method of claim 2, wherein a chloride material balance calculation is performed to account for the chloride derived from the reduced TCE.

4. The method of claim 1, wherein the influent water further comprises nitroso-dimethyl-amine (NDMA), and the denitrified effluent water further comprises reduced levels of NDMA compared to the influent water.

5. The method of claim 1, wherein the levels of nitrate are substantially undetectable in recycle mode prior to switching to feed mode.

6. The method of claim 1, further comprising:
   (d) operating the MBfR device in a recycle mode, using influent water comprising at least a portion of effluent water from (c), for a second period of time sufficient to acclimate the biofilm to reduce perchlorate; and
   (e) operating the MBfR device in a feed mode, using influent water comprising at least a portion of effluent water from (c), to reduce the levels of perchlorate in the influent water.

7. The method of claim 6, wherein the influent water further comprises trichloroethylene (TCE), and the effluent water from (e) further comprises reduced levels of TCE compared to the influent water of (a).

8. The method of claim 7, wherein a chloride material balance calculation is performed to account for the chloride derived from the reduced TCE.

9. The method of claim 6, wherein the influent water further comprises nitroso-dimethyl-amine (NDMA), and the effluent water from (e) further comprises reduced levels of NDMA compared to the influent water of (a).

10. The method of claim 6, further comprising:
    (f) applying the effluent water from (e) to a second MBfR device having a biofilm acclimated to perchlorate reduction; and
    (g) operating the second MBfR device in a feed mode, using as influent water the effluent water from (e), to produce effluent water from the second MBfR device having further reduced levels of perchlorate compared to the effluent water from the MBfR device of (a).

11. The method of claim 10, wherein the levels of perchlorate after (g) are substantially undetectable.

12. The method of claim 1, wherein denitrification and perchlorate reduction are performed by autotrophic bacteria using hydrogen gas as an electron donor.

13. The method of claim 1, wherein the ability of the biofilm to perform denitrification in (b) is determined by comparing the concentration of nitrate in the recirculating water in the MBfR effluent water to the concentration of nitrate in the influent water.

14. The method of claim 1, wherein said hollow filaments supporting the biofilm are made from a material selected from polyester, polyethylene, polypropylene, polyurethane, cellulose triacetate, rayon, and composites thereof.

15. The method of claim 14, wherein said hollow filaments are polypropylene hollow filaments.

16. A method for reducing the concentration of contaminants in ground water comprising:
    (a) providing a source of contaminated ground water comprising nitrate, perchlorate, and trichloroethylene (TCE) and/or nitroso-dimethyl-amine (NDMA) to an MBfR device;
    (b) operating the MBfR device in a recycle mode, using the contaminated ground water, for a first period of time sufficient to form a biofilm in the MBfR device for performing denitrification in the influent water, wherein the MBfR device comprises hollow filaments for supporting the biofilm, and wherein the ability of the biofilm to perform denitrification is determined by comparing the concentration of nitrate in the water in the recycle mode of the MBfR to the concentration of nitrate in the influent water; and
    (c) operating the MBfR device in a feed mode, using the contaminated ground water, to produce effluent water reduced in nitrate, perchlorate, and TCE and/or NDMA; wherein the levels of nitrate, perchlorate, and TCE and/or NDMA are reduced simultaneously.

17. The method of claim 16, wherein a chloride material balance calculation is performed to account for the chloride derived from the reduced TCE.

18. The method of claim 16, wherein the autotrophic denitrifying and perchlorate reducing bacteria are the same type of bacteria, which are acclimated to denitrifying and/or perchlorate reduction by operating the MBfR in a recycle mode using ground water from which nitrate and/or perchlorate is to be removed.

19. The method of claim 16, wherein the autotrophic denitrifying and perchlorate reducing bacteria are different types of bacteria, which can be selected to form a biofilm for denitrifying and/or perchlorate reduction by operating the MBfR in a recycle mode using water from which nitrate and/or perchlorate is to be removed.

20. The method of claim 16, wherein said hollow filaments supporting the biofilm are made from a material selected from polyester, polyethylene, polypropylene, polyurethane, cellulose triacetate, rayon, and composites thereof.

21. The method of claim 20, wherein said hollow filaments are polypropylene hollow filaments.

* * * * *